(12) United States Patent
Knowlton

(10) Patent No.: US 6,229,033 B1
(45) Date of Patent: May 8, 2001

(54) FAT PRODUCTS FROM HIGH STEARIC SOYBEAN OIL AND A METHOD FOR THE PRODUCTION THEREOF

(75) Inventor: Susan Knowlton, Elkton, MD (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/303,193

(22) Filed: May 3, 1999

Related U.S. Application Data

(60) Provisional application No. 60/085,005, filed on May 11, 1998.

(51) Int. Cl.[7] .................................................. C07C 53/120
(52) U.S. Cl. .......................... 554/223; 554/12; 426/601; 426/653
(58) Field of Search ..................... 554/223, 12; 426/601, 426/653

(56) References Cited

U.S. PATENT DOCUMENTS

| | | | |
|---|---|---|---|
| 4,588,604 | 5/1986 | Baker et al. | 426/601 |
| 5,395,629 | 3/1995 | Bertoli et al. | 426/35 |
| 5,405,639 | 4/1995 | Pierce et al. | 426/607 |
| 5,409,728 | 4/1995 | Itagaki et al. | 426/607 |
| 5,557,037 | 9/1996 | Fehr et al. | 800/200 |
| 5,585,535 | 12/1996 | Fehr et al. | 800/200 |
| 5,710,365 | 1/1998 | Kerr et al. | 800/200 |
| 5,795,969 | 8/1998 | Fehr et al. | 554/9 |

FOREIGN PATENT DOCUMENTS

| | | | |
|---|---|---|---|
| 0 245 076 | 11/1987 | (EP) | C11C/3/10 |
| 0 369 519 | 5/1990 | (EP) | A23D/7/00 |
| 0 519 542 | 12/1992 | (EP) | C11B/7/00 |
| 827172 | 2/1960 | (GB) | |
| WO 94/15478 | 7/1994 | (WO) | A23D/9/00 |
| WO 95/07620 | 3/1995 | (WO) | A23D/9/00 |
| WO 97/28695 | 8/1997 | (WO) | A23D/9/00 |

OTHER PUBLICATIONS

Confectionery Fats—For Special Uses, *JAOCS*, 74, No. 3, 468–472, 1997.
Allen, David, Fat modification as a tool for product development. Part 1. Hydrogenation and fractionation, *Lipid Technology*, 10(2), 29–33, Mar. 1998.
Fatty Acid Composition by GLC cis, cis and trans Isomers, AOCS Official Method, CE 1c–89, 1–4, 1997.
List, G.R. et al., Effect of Interesterification on the Structure and Physical Properties of High–Stearic Acid Soybean Oils, *JAOCS*, 74, No. 3, 327–329, 1997.
Specialty Fats Based on Palm Oil and Palm Kernel Oil, *MPOPC*, 1–18, Feb. 24, 1998.
Kheiri, M.S.A., Formulation, Evaluation and Marketing of Cocoa Butter Replacer Fats, PORIM occasional Paper, Palm Oil Research Institute of Malaysia, No. 4, 1–53, Aug. 1982.
Product Data Sheet, Silko® 33–05, Aarhus Inc., Port Newark, NJ, Issue:05, Mar. 1994.
Product Data Sheet, Cebes® 21–25, Aarhus Inc., Port Newark, NJ, Issue:04, Mar. 1994.
Product Information, Prestine 34F, Loders Croklaan USA, Glen Ellyn, IL.
Product Information, Prestine 12F, Loders Croklaan USA, Glen Ellyn, IL.

(List continued on next page.)

*Primary Examiner*—Deborah D. Carr

(57) ABSTRACT

Fractionation of high stearic soybean oils and their use for the production of edible oils and fat products suitable for confectionary and high stability applications is disclosed. High stearic soybean oils which do not contain trans fatty acid isomers, are used to produce fats useful for confectionary applications. In addition, high stearic, high oleic soybean oils having a decreased polyunsaturated fatty acid content are used to produce two products: fats with utility in confectionary applications and liquid, high stability oils.

42 Claims, 2 Drawing Sheets

OTHER PUBLICATIONS

Product Data Sheet, Specialty Fats—Lauric, *Technical Guide to Products,* A C Humko, Memphis, TN, p. 45.

Product Data Sheet, Specialty Fats—Non–Lauric, *Technical Guide to Products,* A C Humko, Memphis, TN, p. 44.

Product Data Sheet, Fractionated Products—Lauric, *Technical Guide to Products,* A C Humko, Memphis, TN, p. 21.

Product Data Sheet, Fractionated Products—Non–Lauric, *Technical Guide to Products,* A C Humko, Memphis, TN, p. 22.

Fractionated High Stearic and High Stearic/High Oleic Soybean Oils Have SFC Profiles Comparable to Cocoa Butter

FAT PRODUCTS FROM HIGH STEARIC SOYBEAN OIL AND A METHOD FOR THE PRODUCTION THEREOF

This application claim benefit to provisional application 60/085,005 filed May 11, 1998.

FIELD OF THE INVENTION

This invention concerns the fractionation of soybean oils and, in particular, high stearic soybean oils to make a fat product useful in confectionary applications. Also of concern is the fractionation of high stearic, high oleic soybean oils to make a fat product useful in confectionary applications and liquid, high stability oils.

BACKGROUND OF THE INVENTION

Fats and oils play a major role in human nutrition and are recognized as essential nutrients in both human and animal diets. Nutritional concerns have led to the replacement of animal-fat shortenings with vegetable oils as the major source of lipids in human diets. The most commonly used vegetable oil worldwide is soybean oil. Over 19 million metric tons of soybean oil were consumed in 1995 alone. The use of soybean oil in the United States is extremely popular. In fact, over 80% of the vegetable oils consumed in the United States are soybean oils which are used in margarines, shortenings, salad and cooking oils, and commercial frying oils. About half of the soybean oil consumed is in the form of margarines or shortenings and frying oils.

The specific performance and health attributes of edible oils in general are determined largely by their fatty acid composition. Soybean oil is composed primarily of palmitic (C16:0), stearic (C18:0), oleic (C18:1), linoleic (C18:2) and linolenic (C18:3) acids and, in that regard, is similar to the other most commonly used vegetable oils including palm, sunflower, canola, cottonseed, peanut, coconut, olive and palm kernel.

By comparison, soybean oil contains relatively high levels of both linoleic and linolenic acid relative to some other vegetable oils. These fatty acids are more prone to oxidation than saturated and monounsaturated fatty acids. Without modification, soybean oil is relatively unstable to oxidation reactions and its use is limited to applications that do not require a high degree of stability. Under extended use, oxidized soybean oil develops off flavors and undergoes physical changes such as increased viscosity and foaming.

Several methods are available to increase the stability of soybean oil. One commonly used method is catalytic hydrogenation, a process that reduces the number of double bonds and raises the melting point of the fat with the aid of a catalyst such as nickel. Specifically, catalytic hydrogenation reduces the level of polyunsaturated fatty acids, primarily linoleic (C18:2) and linolenic (C18:3) acids, and increases oleic (C18:1) and stearic (C18:0) acids. This results in a stable oil suitable for food frying and specialized high stability oil applications due to the reduction of the unsaturated fatty acid content. Also, the physical properties of the oil are changed because the fatty acid modifications increase the melting point resulting in a semi-liquid or solid fat at room temperature. A large percentage of the soybean oil consumed annually is partially hydrogenated soybean oil.

In general, soybean oil is produced using a series of steps involving the extraction and purification of an edible oil product from the oil bearing seed. Soybean oils and soybean byproducts are produced using the generalized steps shown in the diagram below.

| Process | Impurities Removed/ Byproducts Obtained |
|---|---|
| Soybean Seed ↓ | |
| Oil Extraction → | Meal |
| ↓ | |
| Degumming → | Lecithin |
| ↓ | |
| Alkali or Physical Refining → | Gums, Free Fatty Acids, Pigments |
| ↓ | |
| Water Washing → | Soap |
| ↓ | |
| Bleaching → | Color, Soap, Metal |
| ↓ | |
| (Hydrogenation) ↓ | |
| (Winterization) → | Stearine |
| ↓ | |
| Deoderization → | FFA, Tocopherols, Sterols, Volatiles |
| ↓ | |
| Oil Products | |

Soybean seeds are cleaned, tempered, dehulled, and flaked which increases the efficiency of oil extraction. Oil extraction is usually accomplished by solvent (hexane) extraction but can also be achieved by a combination of physical pressure and/or solvent extraction. The resulting oil is called crude oil. The crude oil may be degummed by hydrating phospholipids and other polar and neutral lipid complexes that facilitate their separation from the nonhydrating, triglyceride fraction (soybean oil). The resulting lecithin gums may be further processed to make commercially important lecithin products used in a variety of food and industrial products as emulsification and release (antisticking) agents. Degummed oil may be further refined for the removal of impurities; primarily free fatty acids, pigments, and residual gums. Refining is accomplished by the addition of a caustic agent that reacts with free fatty acid to form soap and hydrates phosphatides and proteins in the crude oil. Water is used to wash out traces of soap formed during refining. The soapstock byproduct may be used directly in animal feeds or acidulated to recover the free fatty acids. Color is removed through adsorption with a bleaching earth that removes most of the chlorophyll and carotenoid compounds. The refined oil can be hydrogenated resulting in fats with various melting properties and textures. Winterization (fractionation) may be used to remove stearine from the hydrogenated oil through crystallization under carefully controlled cooling conditions. Deodorization which is principally steam distillation under vacuum, is the last step and is designed to remove compounds which impart odor or flavor to the oil. Other valuable byproducts such as tocopherols and sterols may be removed during the deodorization process. Deodorized distillate containing these byproducts may be sold for production of natural vitamin E and other high-value pharmaceutical products. Refined, bleached, (hydrogenated, fractionated) and deodorized oils and fats may be packaged and sold directly or further processed into more specialized products. A more detailed reference to soybean seed processing, soybean oil production and byproduct utilization can be found in Erickson, 1995, Practical Handbook of Soybean Processing and Utilization, The American Oil Chemists' Society and United Soybean Board.

Soybean oil is liquid at room temperature because it is relatively low in saturated fatty acids when compared with oils such as coconut, palm, palm kernel and cocoa butter.

Many processed fats, including spreads, confectionary fats, hard butters, margarines, baking shortenings, etc., require varying degrees of solidity at room temperature and can only be produced from soybean oil through alteration of its physical properties. This is most commonly achieved through catalytic hydrogenation.

Hydrogenation is a chemical reaction in which hydrogen is added to the unsaturated fatty acid double bonds with the aid of a catalyst such as nickel. High oleic soybean oil contains unsaturated oleic, linoleic, and linolenic fatty acids and each of these can be hydrogenated. Hydrogenation has two primary effects. First, the oxidative stability of the oil is increased as a result of the reduction of the unsaturated fatty acid content. Second, the physical properties of the oil are changed because the fatty acid modifications increase the melting point resulting in a semi-liquid or solid fat at room temperature.

There are many variables which affect the hydrogenation reaction which in turn alter the composition of the final product. Operating conditions including pressure, temperature, catalyst type and concentration, agitation and reactor design are among the more important parameters which can be controlled. Selective hydrogenation conditions can be used to hydrogenate the more unsaturated fatty acids in preference to the less unsaturated ones. Very light or brush hydrogenation is often employed to increase stability of liquid oils. Further hydrogenation converts a liquid oil to a physically solid fat. The degree of hydrogenation depends on the desired performance and melting characteristics designed for the particular end product. Liquid shortenings, used in the manufacture of baking products, solid fats and shortenings used for commercial frying and roasting operations, and base stocks for margarine manufacture are among the myriad of possible oil and fat products achieved through hydrogenation. A more detailed description of hydrogenation and hydrogenated products can be found in Patterson, H. B. W., 1994, Hydrogenation of Fats and Oils: Theory and Practice. The American Oil Chemists' Society.

Hydrogenated oils have also become controversial due to the presence of trans fatty acid isomers that result from the hydrogenation process. Ingestion of large amounts of trans isomers has been linked with detrimental health effects including increased ratios of low density to high density lipoproteins in the blood plasma and increased risk of coronary heart disease. It would be advantageous to produce foods that currently use hydrogenated oils in a form that would be free of trans fatty acids.

The term "substantially free of trans fatty acids" as used herein means a non-health threatening level of trans fatty acids. For example, such a level can range from below 1% (i.e., an amount which cannot be reliably detected by current methods for assessing trans fatty acid levels) to an upper limit which does not pose a health risk. In the near future, the Federal government is expected to place an upper limit on the levels of trans fatty acid isomers that can be present in foods and have the designation "trans fatty acid free".

It is believed that all of the oils, margarines and spread products of the invention are expected to conform to whatever limits are imposed by governmental authorities.

The limit of detection for trans isomers of fatty acids in oils is around 0.1% (The gas chromatography method for detecting trans fatty acids in oils is outlined in AOCS Ce 1C-89). Reports of "low trans isomer oils" produced by modifications of the hydrogenation method can achieve levels of 5–20% (w/w), but usually at the cost of high saturated fatty acid levels (Allen, D. A. (1998) Lipid Technology, 10(2), 29–33). It is believed that the oils, fat products, and blended fat products, that are wholly or partially non-hydrogenated and non-chemically modified, in the instant invention, should be substantially free of trans fatty acids, i.e., they should achieve trans fatty acid concentrations of below 20% (w/w), preferably below 10%, more preferably below 5%, even more preferably below 3%, and again more preferably below 1%, and most preferably below 0.5% of the oil.

The term "non-hydrogenated" will be used to define oils that have not been subjected to any physical or chemical hydrogenation process that causes changes in, or is designed to alter, the naturally occurring fatty acid composition of the oil, including, but not limited to, all of the processes outlined in the background. The term hydrogenation will be used to define oils that have been subjected to hydrogenation process(es) that alter the naturally occurring fatty acid composition of the oil, including, but not limited to, all of the processes outlined in the background.

The term "non-chemically modified" will be used to describe any oil that has not undergone any chemical modification, including but not limited to interesterification, that results in an alteration of the naturally occurring complement and structure of the oil's fatty acids. The term "chemical modification" will be used to describe any oil that has undergone any chemical modification that results in the alteration of the naturally occurring complement and structure of the oil's fatty acids, including, but not limited to, interesterification outlined in the background.

In addition, hydrogenated fats have their limitations. It is often very difficult to produce fats with the appropriate plasticity across the wide range of temperatures required for a given application. Those with high melting points impart an unpleasant mouth feel resembling wax. For example, the solids, crystallization and melting requirements for confectionary fats such as cocoa butter replacements and substitutes are notoriously difficult and expensive to reproduce.

Interesterification refers to the exchange of the fatty acyl moiety between an ester and an acid (acidolysis), an ester and an alcohol (alcoholysis) or an ester and ester (transesterification). Interesterification reactions are achieved using chemical or enzymatic processes. Random or directed transesterification processes rearrange the fatty acids on the triglyceride molecule without changing the fatty acid composition. The modified triglyceride structure may result in a fat with altered physical properties. Directed interesterfication reactions using lipases are becoming of increasing interest for high value specialty products like cocoa butter substitutes. Products being commercially produced using interesterification reactions include but are not limited to shortenings, margarines, cocoa butter substitutes and structured lipids containing medium chain fatty acids and polyunsaturated fatty acids. Interesterification is further discussed in Hui, Y. H., 1996, Bailey's Industrial Oil and Fat Products, Volume 4, John Wiley & Sons.

Most confectionary fats have a high solid fat content at room temperature but also must melt quickly in the mouth. Cocoa butter is a unique fat which exhibits these types of physical properties. Products made with cocoa butter, such as chocolate, are solid at room temperature, have a desirable "snap" when broken, melt smoothly and rapidly in the mouth with no "axy" or greasy impression, and provide a cooling sensation on the palate and good flavor release. Contraction of the fat upon cooling is also important for molded products. Cocoa butter is excellent in this regard.

Cocoa butter is relatively expensive and subject to price fluctuation and availability dependent on the volatility of the cocoa-bean market. It also exhibits an undesirable tendency towards "fat bloom" which appears on the surface of the product due to changes in the crystal structure of the fat. Products destined for tropical climates may need the addition of other fats or hard butters to increase the solidity of the product at higher ambient temperatures. As a result, a market for fat alternatives to cocoa butter, that exhibit many of the same physical properties, has developed.

Confectionary fats made from fats other than cocoa butter are designed to have many of the positive attributes and properties of cocoa butter to make them suitable for these types of applications. They are, however, often expensive to produce and may only exhibit some of the desired physical properties. Confectionary fats are produced from palm oil fractions, palm kernel oil and its fractions and from fractionated hydrogenated vegetable oils which contain a high trans fatty acid isomer content. Both dry and solvent fractionation have been used to produce products with different compositions. Often several processing steps including hydrogenation, fractionation and/or interesterification are employed to produce a product with the right melting characteristics.

The unique properties of cocoa butter result from the chemical composition of the fat. Since it is a natural fat, its composition shows normal variation depending on what country (environment) the fat originates from. The three major fatty acids of cocoa butter include palmitic (26%), stearic (34%), and oleic (34%). The physical characteristics of cocoa butter result from the arrangement of these fatty acids on the triglyceride. There exists a high degree of symmetrical monounsaturated triglycerides which have the unsaturated fatty acid in the 2-position and saturated fatty acids in the 1- and 3- positions. These triglycerides are most often 2-oleoyl-1-palmitoyl-3-stearoylglycerol (POS), and 2-oleoyl-1,3-distearolylglycerol (SOS), and 2-oleoyl-1,3-dipalmitoylglycerol (POP), with POS being present in the largest amount. These three major triglycerides have crystal forms with melting points just below body temperature.

Other oils or their fractions can be used to produce confectionary fats such as palm kernel, palm, illipe, shea, sal, coconut, and various vegetable fats. These oils have fatty acid compositions which differ from that of cocoa butter but may have similar physical properties.

Industry suppliers use a variety of terms to categorize confectionary fats of which the more common terms included cocoa butter equivalents, cocoa butter improvers, cocoa butter substitutes, cocoa butter replacers, hard butters, coating fats, compound coatings, center filling fats, and non-dairy fats. These fats will vary somewhat in melting behavior depending on the particular application for which the fat is destined.

Cocoa butter extenders are generally based on illipe, shea, and/or palm oil. The supply of these more "exotic" oils may be erratic. They are fractionated and mixed to achieve the proper melting characteristics. They may be used in any proportion up to 100% with cocoa butter for complete replacement. Fats with higher solids and melting points can be used to improve the properties of cocoa butter. The addition of up to 5% cocoa butter extender in chocolate products (of the total weight of the product) is permitted without label declaration in some countries.

Cocoa butter substitutes and replacers are usually described as lauric or non lauric depending on the fat from which they are derived. Lauric cocoa butter substitutes are based mainly on palm kernel oil. The required physical properties are obtained by fractionation, blending, hydrogenation, interesterification or a combination of these. They have a high solid fat content at 20° C., do not require tempering, resist fat bloom, and have favorable thermal properties and contract upon cooling. However they are not completely compatible with cocoa butter in that they may result in an undesirable softening of the mixed product. Therefore, lauric cocoa butter substitutes usually do not exceed 5–6% of the product. They also suffer from hydrolysis in products which contain a source of both water and lipases (e.g., cocoa powder, nuts, milk products, etc.). Hydrolysis releases free lauric acid which gives the product an unpleasant soapy taste. Hydrolysis of non-lauric cocoa butter substitutes release longer chain fatty acids which do not impart this taste.

Non-lauric cocoa butter substitutes are generally produced by hydrogenation of liquid oils and subsequent fractionation or blending. They are based on sunflower, canola, cottonseed, soybean, peanut, corn, safflower and palm. Hydrogenation of these oils results in a high level of trans fatty isomers which, in addition to saturated fatty acids, results in fats with a higher melting point. Further fractionation results in fats with a narrower melting range. They can be used in greater proportion with cocoa butter (~25%) and are often used for coating because they have good gloss, long shelf life, and a high resistance to bloom. Their use is limited by poor eating quality, flavor release and mouth feel.

U.S. Pat. No. 5,557,037, issued to Fehr et al. on Sep. 17, 1996, describes soybeans having elevated contents of saturated fatty acids wherein the palmitic acid content is at least about 14% of the total fatty acid composition and the stearic acid content is at least about 20% or more of the total fatty acid composition. Soybean varieties having sufficiently elevated palmitic and stearic acid contents are desirable, in that plastic fat (e.g., shortening and margarine) can be produced with the matrix stabilized in the B' form. There is no disclosure that high stearic soybean oils would be suitable for use in confectionary applications.

List et al., Journal of the American Oil Chemists' Society, Vol. 74, No. 3, pages 468–472 (1997) discusses the effect of interesterification on the structure and physical properties of high stearic soybean oils. It was found that after random interesterification, these oils exhibited solid fat index profiles and dropping points suitable for soft tub margarine. There is no disclosure that the solid fat index profiles and dropping points of high stearic soybean oils would be suitable for use in confectionary applications.

European Patent Application Publication Number 245,076, published on Nov. 11, 1987, describes edible fats for confectionary applications made by rearrangement of unsaturated high oleic glyceride oils and fats under the influence of a lipase enzyme in the presence of saturated fatty acids or esters thereof wherein the oils and fats consist substantially of 2-unsaturated triglycerides at least 80% of which are 2-oleoyl tricylcerides.

GB Patent Specification having number 827,172, published, Feb. 3, 1960, describes cocoa butter substitutes in which at least a part of the cocoa butter is replaced with a fraction of palm oil having an iodine value not exceeding 45, a dilatation at 20° C. of not less than 1000 and a softening point between 30° and 45° C.

U.S. Pat. No. 5,405,639, issued to Pierce et al. on Apr. 1, 1995, describes non-tempering confectionary fats.

"Confectionary Fats - - - For Special Uses", Journal of the American Oil Chemists' Society, Vol. 61, No. 3, pages 468–472 (March 1984) discusses what is new relative to fats and oils in the U.S. confectionary industry.

Kheiri, Formulation, Evaluation and Marketing of Cocoa Butter Replacer Fats, Palm Oil Research Institute of Malaysia, No. 4, pages 1–53 (August 1982), discusses the formation, evaluation and marketing of confectionary fats for chocolate-based products.

PCT International Application having Publication Number WO 94/15478, published on Jul. 21, 1994, discloses an improved vegetable oil and fractionation process.

European Patent Application Publication Number 519,542, published on Dec. 23, 1992, describes a combined fractionation, refining and interesterification process.

European Patent Application Publication Number 369,519, published on May 23, 1990, describes an edible spread and processes for making such a spread.

TMPOPC, Specialty Fats Based on Palm Oil and Palm Kernel Oil, pages 1–18, (Feb. 24, 1998), describes, specialty fats designed to have the positive traits of cocoa butter or properties that make them more suitable for specific applications.

New product development by confectioners challenges the fats and oils producers to further their research and development efforts to produce specialized fats to fill the needs of the confectionary industry. Oil chemists and researchers continue to develop new technology to provide fats with characteristics more closely resembling those of cocoa butter.

None of the references discussed above addresses the use of high stearic, and/or high stearic plus high oleic, soybean oils to make fat products, whether in a blended or unblended form, suitable for confectionary applications.

SUMMARY OF THE INVENTION

The present invention concerns a fat product made from the fractionation of a high stearic soybean oil having a C18:0 content of at least 15% of the fatty acid moieties in the oil wherein said fat product is useful for confectionary applications.

In another embodiment, this invention concerns a method for making a fat product for confectionary applications which comprises fractionating a high stearic soybean oil having oil having a C18:0 content of at least 15% of the fatty acid moieties in the oil under conditions suitable for obtaining a fat product useful for confectionary applications.

In still another embodiment, this invention concerns a method for making two products wherein one product is for confectionary applications and the second product is a high oleic soybean oil having high oxidative stability, said method comprising fractionating a high stearic, high oleic soybean oil having a C18:0 content of at least 15% of the fatty acid moieties in the oil and a C18:1 content of greater than 55% of the fatty acid moieties in the oil under conditions suitable for obtaining a fat product useful for confectionary applications.

BIOLOGICAL DEPOSIT

The following soybean seed has been deposited with the American Type Culture Collection (ATCC), 10801 University Boulevard, Manassas, Va. 20110–2209, and bears the following designation, accession number and date of deposit.

| Soybean | Accession Number | Date of Deposit |
| --- | --- | --- |
| Soybean L9216116-109 | ATCC 203946 | April 20, 1999 |

DETAILED DESCRIPTION OF THE INVENTION

Figure 1:
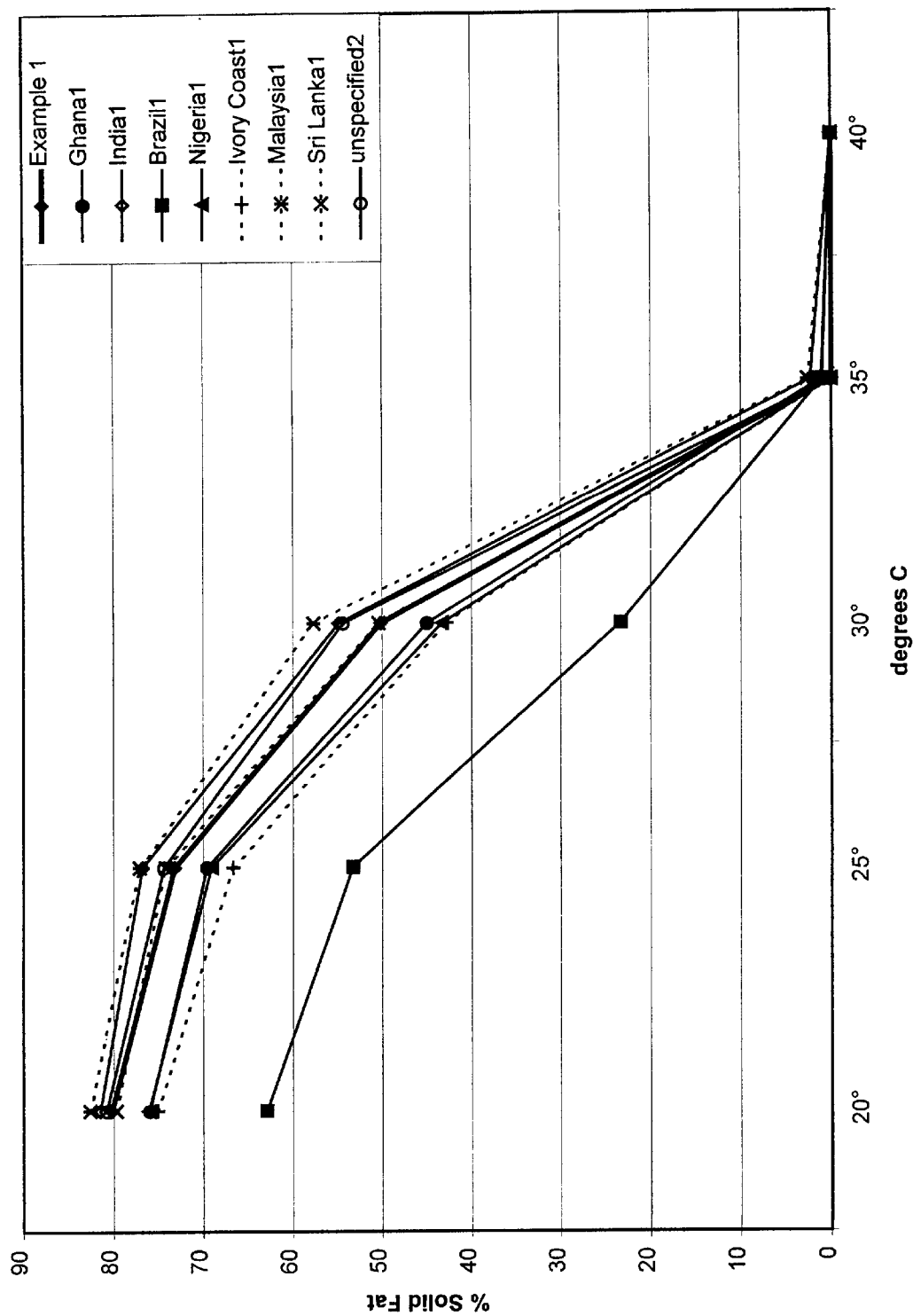
FIG. 1 depicts the Solid Fat Content (SFC) profile of various cocoa butters. There is natural variation in the SFC profile at a given temperature for different cocoa butter sources, however, the overall shape of the profile remains similar. The rapid decline in SFC profile between 25° and 35° C. is a distinctive property of cocoa butter.

The present invention concerns a fat product made from the fractionation of a high stearic soybean oil having a C18:0 content of at least 15% of the fatty acid moieties, preferably at least 20% of the fatty acid moieties, and most preferably at least 22% of the fatty acid moieties in the oil, wherein said fat product is useful for confectionary applications. Preferably, the fractionated product should have a stearic acid content of greater than 35% of the fatty acid moieties, more preferably greater than 40% of the moieties, and most preferably greater than 50% of the moieties in the oil. It is also believed that the starting oils and the fractionated products used in the present invention can be in a non-hydrogenated and non-chemically modified form, or can be used in a hydrogenated and/or chemically modified form.

In another aspect this invention also concerns a method for making a fat product for confectionary applications which comprises fractionating high stearic soybean oil having a C18:0 content of at least 15% of the fatty acid moieties, preferably at least 20% of the fatty acid moieties, and most preferably at least 22% of the fatty acid moieties in the oil under conditions suitable for obtaining a fat product useful for confectionary applications.

In still another aspect, this invention concerns a confectionary which comprises a fat product obtained from the fractionation of a high stearic soybean oil having a C18:0 content of at least 15% of the fatty acid moieties, preferably at least 20% of the fatty acid moieties, and most preferably at least 22% of the fatty acid moieties in the oil.

The term "fat product" as used herein refers to vegetable oils either in a non-hydrogenated and non-chemically modified form, or in a hydrogenated and/or chemically modified form, or fractions derived therefrom, either in a non-hydrogenated and non-chemically modified form, or in a hydrogenated and/or chemically modified form.

The term "mature seed" refers to a soybean that is no longer green that has, or did have, a moisture content of less than 20%, and preferably less than 12%. Furthermore, as used herein, "soybean" refers to the species Glycine max, Glycine soja, or any species that is sexually cross compatible with Glycine max. A "line" is a group of plants of similar parentage that display little or no genetic variation between individuals for a least one trait. Such lines may be created by one or more generations of self-pollination and selection, or vegetative propagation from a single parent including by tissue or cell culture techniques.

The term "non-hydrogenated" will be used to define oils that have not been subjected to any physical or chemical hydrogenation process that causes changes in, or is designed to alter, the naturally occurring fatty acid composition of the oil, including, but not limited to, all of the processes outlined in the background. The term hydrogenation will be used to define oils that have been subjected to hydrogenation process(es) that alter the naturally occurring fatty acid composition of the oil, including, but not limited to, all of the processes outlined in the background.

The term "non-chemically modified" will be used to describe any oil that has not undergone any chemical modification, including but not limited to interesterification, that results in an alteration of the naturally occurring complement and structure of the oil's fatty acids. The term "chemical modification" will be used to describe any oil that has undergone any chemical modification that results in the alteration of the naturally occurring complement and structure of the oil's fatty acids, including, but not limited to, interesterification outlined in the background.

Fractionation processes of vegetable oils are well known in the literature. This process involves the separation of solids from an oil under reduced temperature. The most widely practiced form of fractionation is that of crystallization wherein a mixture of triglycerides is separated into two or more different melting fractions based on solubility at a given temperature. Fractionation may be described either as "wet" or "dry" depending on the presence or absence of solvent. Dry fractionation is achieved by pressing the liquid oil from the solid fat by means of hydraulic pressure. Solvent fractionation (wet) is used to describe a process for the crystallization of a fraction from a mixture of triglycerides dissolved in a solvent. Fractions may be selectively crystallized at different temperatures after which the fractions are separated and the solvent removed.

Wet fractionations are especially well known in the literature wherein an organic solvent such as a hydrocarbon, e.g., hexane or a ketone like acetone is used, are described at some length. In these common wet fractionations, multiple stages are often applied. An optional first fractionation at about 10°–25° C. may be performed, in which a fat rich in stearin may be recovered. For oils that are low in stearin this step may be omitted. A fractionation at about −5° to +5° C. is routinely performed to separate out a fat fraction with a relatively solid character. A liquid fraction remains, which may also be recovered. Solvent is removed to yield the final fat fractions from these separations. In this way, up to three fractions may be obtained from the most conventional vegetable fats. A first fraction containing most of the fully saturated triglycerides (i.e., the stearin fraction), another fraction which is rich in triglycerides that are composed of mixed saturated and unsaturated fatty acyl moieties, and a liquid fraction which is rich in unsaturated triglycerides. In the instant case no attempt was made to obtain a stearin fraction.

Industry suppliers use a variety of terms to categorize confectionary fats. The more common terms include cocoa butter equivalents, cocoa butter improvers, cocoa butter substitutes, cocoa butter replacers, hard butters, coating fats, compound coatings, center filling fats, and non-dairy fats. These fats will vary somewhat in melting behavior depending on the particular application for which the fat is destined.

Alternatives or substitutes for cocoa butter are desirable due to an uncertain supplies and volatile prices of the fluctuating cocoa-bean market. As early as the 1930's, confectioners attempted to use fats other than cocoa butter in their formulations. With newer technology, oil chemists and researchers have developed fats with characteristics more closely resembling those of cocoa butter. These fats are known today as hard butters, developed from domestic vegetable oils, as well as palm kernel, coconut, and palm oils. In addition, exotic oils from other parts of the world, such as shea, sal and illipe, can also be utilized.

Industry suppliers use a variety of terms to categorize hard butters, with the most commonly accepted terms being cocoa butter equivalents or extenders, cocoa butter substitutes, partial replacers, total replacers, modifiers and extenders.

Cocoa butter equivalents and extenders (CBE) are all vegetable, nonhydrogenated specialty fats containing almost the same fatty acids and symmetrical unsaturated triglycerides as cocoa butter. They often are fully compatible with cocoa butter, and usually are tropical in origin. They are prepared by blending, fractionation and/or interesterification of oils derived from illipe, shea, palm, and sal fat. Careful blending of fractions can yield hard butters with chemical and physical properties closely matching those of cocoa butter. Cocoa butter equivalents and extenders can be mixed with cocoa butter in any proportion up to 100% without altering the final products' melting characteristics. CBE can be used in chocolate-type and non-chocolate type confections, in coating and as molded products, as cool melting center fats, or as an extra coating layer below a chocolate coating to protect the outer layer from center fat migration.

It is also possible to tailor CBEs to have a higher solid fat content than cocoa butter and these products are generally referred to as cocoa butter improvers (CBI). These products are often used to improve soft cocoa butter products destined for tropical climates and even out variations in the properties of cocoa butter from different parts of the world. Cocoa butter improvers melt a little more slowly than cocoa butter. The addition of 5% CBE or CBI to chocolate products is permitted without label declaration in may countries including Japan, Canada, South Africa, Norway, Sweden, Finland, Great Britain, Ireland and Denmark.

Cocoa butter substitutes (CBS) are available in two types, lauric and non-lauric. Lauric CBS are not compatible with cocoa butter and must therefore be used with low fat cocoa powder. Because these fats replace cocoa butter they are also known as cocoa butter replacers (CBR). They are usually derived from the fractionation, blending, hydrogenation and/or interesterification of palm kernel or coconut oil. Lauric CBS are subject to two problems. Because they form eutectics with cocoa butter, the presence of even small amount of cocoa butter may result in undesirable softening and/or fat bloom of the final product. They are also subject to hydrolysis which results in the release of free lauric acid giving the product an unpleasant soapy taste.

Non lauric CBS are produced by hydrogenation of liquid oils, frequently followed by fractionation and or blending. The raw materials may include sunflower, canola, cottonseed, palm or soy oils. Hydrogenation is used to increase the solids content of the oil followed by fractionation to achieve a product with a steep melting curve. Their use may be limited by poor eating quality, flavor release, and mouth feel. Careful fractionation of products can result in better eating quality, however the product is more expensive.

All of the fats described above can be used in various specialty applications including coating fats, center filling fats, binders, lubricating fats, and substitute dairy fats including coffee whiteners and ice cream ingredient products. Coating fats have a rapid meltdown in the mouth and yet do not melt on the fingers. These fats have a relatively high solid-fat content at room temperature. This level should be near or above 50%, as lower levels can lead to a greasy or tacky feel. Fats that melt away quickly and completely at mouth temperature, typically near 34°–37° C., are sought for many chocolate type applications. Confectionary fillings are essentially mixtures of center filling fats and sugar, together with a selection of flavor contributing ingredients. The fats in cream fillings may contain various levels of solid fat at room temperature, depending on the type of applications. The filling fat should be compatible with the coating fats since they can migrate to the coating or vice versa, and this process can affect product integrity and appearance because of softening and fat bloom. Coating and center products that are similar in composition are less likely to be affected by fat migration.

Most confectionary products have a high fat content and as a result the meltdown in the mouth is extremely critical. The standard of excellence in this respect is cocoa butter. The unique properties of cocoa butter result from the chemical composition of the fat. Cocoa butter is composed of predominantly symmetrical triglycerides with oleic acid in the 2-position. Cocoa butter has a melting range of 32°–35° C. (90°–95° F.) and softens around 30°–32° C. (86°–90° F.). The completely liquid fat display a tendency to supercool, an important factor in chocolate enrobing and molding. Cocoa butter characteristics include a brittle, non-greasy texture at room temperature, quick meltdown at mouth temperature, excellent keeping qualities such as resistance to oxidation and a high coefficient of contraction on crystallization.

Since it is a natural fat, its composition shows normal variation depending on what country (environment) the fat originates from. The three major fatty acids of cocoa butter include palmitic (26%), stearic (34%), and oleic (34%). The physical characteristics of cocoa butter result from the arrangement of these fatty acids on the triglyceride. There exists a high degree of symmetrical monounsaturated triglycerides which have the unsaturated fatty acid in the 2-position and saturated fatty acids in the 1- and 3- positions. These triglycerides are most often 2-oleoyl-1-palmitoyl-3-stearoylglycerol (POS), and 2-oleoyl-1,3-distearolylglycerol (SOS), and 2-oleoyl-1,3-dipalmitoylglycerol (POP), with POS being present in the largest amount. These three major triglycerides have crystal forms with melting points just below body temperature.

In order for a fat product made from the fractionation of a high stearic soybean oil, which can be in a non-hydrogenated, non-chemically modified form, such oil has a C18:0 content of at least 15% of the fatty acid moieties in the oil to be useful for confectionary applications and it should have a solid fat content profile comparable to the solid fat content profile of a confectionary fat. Examples of solid fat content profiles that are suitable for practicing the invention include, but are not limited to, the following: an SFC of between 60 and 90 at 10° C. and less than 21 at 35° C., an SFC of between 60 and 90 at 10° C. and less than 15 at 35° C., an SFC of between 60 and 90 at 10° C. and less than 10 at 35° C., an SFC of between 60 and 90 at 10° C. and less than 5 at 35° C., a SFC of between 75 and 90 at 10° C. and less than 5 at 35° C., and an SFC of between 80 and 90 at 10° C. and less than 5 at 35° C.

As used herein "confectionary fat" includes cocoa butter extenders, cocoa butter substitutes/equivalents, cocoa butter replacers, hard butters, coating fats, compounds coatings, center filling fats, non-dairy fats, and specialty fats. In another aspect, this invention concerns making blended fat products suitable as confectionary fats. These blended fat products comprise any of the fat products of the invention, blended with other fat products, to produce a blended fat product suitable for use as a confectionary fat. As those skilled in the art will appreciate, the choice of other fat products will depend upon the intended used. For example, cocoa butter, and untreated or hydrogenated/chemically modified forms of sunflower, canola, cottonseed, palm, soybean, illipe, shea, sal, palm kernel, or coconut oils can be used in combinations with the oils of the instant invention.

As was noted above, these fats will vary somewhat in melting behavior depending on the particular application for which the fat is destined. The solid fat content profiles for these specialty fats are well known to those skilled in the art. Examples of some of these can be found in Tables 1 and 2 and in the indicated references. Many other sources list physical properties of specialty fats; see for example Table I in Stauffer, C. E. (1998) Cereal Foods World 43(3): 124, and (anonymous) (1984) JAOCS 61(3): 468–472.

TABLE 1

Solid Fat Content Profiles of Cocoa Butter and Hard Butter

| | Solid fat content | | | | | |
|---|---|---|---|---|---|---|
| | 10° | 20° | 25° | 30° | 35° | 40° |
| cocoa butter-Ghana[1] | | 76 | 69.6 | 45 | 1.1 | |
| cocoa butter-India[1] | | 81.5 | 76.8 | 54.9 | 2.3 | |
| cocoa butter-Brazil[1] | | 62.9 | 53.3 | 23.3 | 1 | |
| cocoa butter-Nigeria[1] | | 76.1 | 69.1 | 43.3 | 0 | |
| cocoa butter-Ivory Coast[1] | | 75.1 | 66.7 | 42.8 | 0 | |
| cocoa butter-Malaysia[1] | | 82.6 | 77.1 | 57.7 | 2.6 | |
| cocoa butter-Sri Lanka[1] | | 79.7 | 74.2 | 50.4 | 0.1 | |
| cocoa butter-unspecified[2] | 91.6 | 80.8 | 74.4 | 54.4 | 0 | 0 |
| hard butter/coating fat[2] | 93 | 66 | 51 | 36 | 11 | 0 |
| hard butter/coating fat[2] | 83 | 56 | 43 | 28 | 9 | 0 |
| anti-bloom chocolate filling fat[3] | | 66 | | 27 | 10 | 1 |
| anti-bloom chocolate filling fat[4] | | 49 | 24 | 7 | 1 | |

[1]Shulka, V.K.S. (1997) INFORM 8(2), 152–162
[2]Bailey's Industrial Oil and Fat Products, Vol. 2, 4rth Ed., John Wiley & Sons, New York (1982)
[3]Loders Croklaan Product Information Sheet, Pristine 34F
[4]Loders Croklaan Product Information Sheet, Prestine 12F

TABLE 2

Solid Fat Content Profiles and Melting Points of Specialty Fats[1]

| | Solid fat content | | | | | | | | |
|---|---|---|---|---|---|---|---|---|---|
| | Wiley 10° | 15° | 20° | 25° | 30° | 35° | 40° | 45° | Melting Pt |
| wafer filler fat | 76(6) | 60(5) | 45(5) | 32(4) | 17(2) | 1(1) | <1 | | 35(1) |
| sandwich cookie filling fat | 53(4) | 39(3) | 28(3) | 21(2) | 11(1) | 5(1) | <1 | | 39(1) |
| hard butter | 88(5) | 75(5) | 61(5) | 47(4) | 32(4) | 10(1) | 0 | | 39(1) |
| coating fat | 88(5) | 75(5) | 61(5) | 47(4) | 32(4) | 10(1) | 0 | | 39(1) |
| puff paste margarine | 47(4) | 40(4) | 33(3) | 27(2) | 21(2) | 16(1) | 11(1) | 7(1) | 34(2) |

[1]Stauffer, C.E., Fats and Oils, Practical Guide for the Food Industry, Eagan Press A good quality cocoa butter substitute is hard at ambient temperature, has sharp melting characteristics like cocoa butter and has a high degree of compatibility with cocoa butter and/or cocoa butter-milk fat blends.

Thus, most confectionary fats have a high solid fat content at room temperature but also must melt quickly in the mouth. Cocoa butter is a unique fat which exhibits these types of physical properties. As a result, products made with cocoa butter such as chocolate, are solid at room temperature, have a desirable "snap" when broken, melt smoothly and rapidly in the mouth with no "waxy" or greasy impression, and provide a cooling sensation on the palate and good flavor release. Contraction of the fat upon cooling is also important for molded products. Cocoa butter is excellent in this regard.

A common method for determining the solidity of fats at critical temperatures is the AOCS standard method Cd16b-93(97) for Solid Fat Content (SFC). This measurement is determined by low-resolution nuclear magnetic resonance (NMR). For confectionary fats such as cocoa butter and specialty fats, the direct, serial, stabilizing method is practiced. The SFC NMR direct method measures and compares signals from the solid and liquid phases. SFC is defined as the ratio between the NMR response obtained from the hydrogen nuclei in the solid phase versus the response obtained from nuclei in both the solid and the liquid phases of the sample. The serial, stabilizing method utilizes a single set of samples that are tempered by melting and storage at 100° C. for 15 minutes, holding at 60° C. for 5 minutes, 0° C. for 90 minutes, 26° C. for 40 hours, and returned to 0° C. for 90 minutes. The samples are then held at each recording temperature for 60 minutes and moved to the next higher temperature immediately after determination of SFC. For a given sample, the percentage of solids is measured across temperatures generally ranging between 10° and 40° C. The entire SFC curve is required in order to understand the properties of the fat at different temperatures. The functionality of the fat is based on both the solids content and on the slope of the SFC curve at critical temperatures, for example, between room and body temperature. In this way, the plasticity of the fat can be predicted for temperatures critical to performance.

The melting point of a fat is also an important measurement. Since fats are made up of a mixture of triglycerides which have different melting points, a sharp determination is not always possible. There are several methods common to the industry which measure melting point including capillary melting point (AOCS Cc1-25-93), Wiley melting point (AOCS Cc2-38-91), slip point (AOCS Cc3-25-93), and dropping point (AOCS Cc18-80-95).

Any high stearic soybean oils having a C18:0 content of at least 15% of the fatty acid moieties in the oil can be used to practice the instant invention. More preferably the C18:0 content should be at least 20% and most preferably at least 22% of the fatty acid moieties in the oil. Examples of suitable high stearic soybean oils can be found in U.S. Pat. No. 5,557,037 which issued on Sep. 17, 1996, the disclosure of which is hereby incorporated by reference.

Another soybean oil which can be used to practice the present invention is a high stearic, high oleic soybean oil having high oxidative stability and a C18:0 content of at least 15% of the fatty acid moieties in the oil and a C18:1 content of greater than 55% of the fatty acid moieties in the oil. When this high stearic, high oleic oil is fractionated under conditions suitable for obtaining a fat product useful for confectionary applications two products are obtained. One product is useful for confectionary applications such as that described above and the second product is a high oleic soybean oil having high oxidative stability such as that described in Applicants' Assignee's PCT Application having publication number WO 97/40698 which was published on Nov. 6, 1997 the disclosure of which is hereby incorporated by reference. A soybean oil with "high oxidative stability" is a soybean oil that is less susceptible to oxidative degradation when compared to normal soybean oil.

Thus, another aspect of this invention concerns a method for making two products wherein one product is a fat product suitable for confectionary applications and the second product is a high oleic soybean oil having high oxidative stability, said method comprising fractionating a high stearic, high oleic soybean oil having a C18:0 content of at least 15% of the fatty acid moieties in the oil and a C18:1 content of greater than 55% of the fatty acid moieties in the oil under conditions suitable for obtaining a fat product useful for confectionary applications. The fractionated high stearic, high oleic soybean oil has an OSI (110) greater than 25 hours.

A number of methods are well known to those skilled in the art for determining oxidative stability. A commonly used method to evaluate the stability of commercial oils is the AOCS method Cd12b-92(93) Oxidative Stability Index (OSI) which is measured automatically using a machine manufactured by Ornion, Inc. of Rockland, Mass., USA.

The OSI machine works by bubbling air through oil heated to 110° C. As the oil oxidizes, volatile organic acids, primarily formic acid, is formed which can be collected in distilled water in a cell. The machine constantly measures the conductivity of the distilled water and the induction period is determined as the time it takes for this conductivity to begin a rapid rise.

EXAMPLES

The following Examples are intended to illustrate the present invention and do not constitute a limitation thereon. All temperatures are given in Celsius unless indicated otherwise. Solid Fat Content profiles listed in these Examples report the percentage of the total fat moieties that were determined to be in the solid phase at the indicated temperature.

Example 1

Solid Fat Content determinations of cocoa butter and cocoa butter substitutes

Samples of (1) a commercial cocoa butter, (2) a hydrogenated, fractionated lauric cocoa butter substitute, (3) a hydrogenated, interesterified lauric cocoa butter substitute, and (4) a confectioners coating, center fat were analyzed for SFC by AOCS method Cd16b-93(97). The results are listed in Table 3. Sharp drops in SFC between 30° and 35° C. were indicative of (a) the distinctive behavior of cocoa butter and (b) confectionary fats which maintain a substantially solid character at room temperature yet melt at a temperature close to body temperature.

TABLE 3

Solid fat content of cocoa butter sample

| | Temperature: | | | | | | |
|---|---|---|---|---|---|---|---|
| | 10° | 15° | 20° | 25° | 30° | 35° | 40° |
| SFC (%) | | | | | | | |
| Cocoa butter | 87.8 | — | 80.2 | 73.2 | 50.2 | 0 | 0 |
| hydrogenated, fractionated lauric cocoa butter substitute | 89.5 | 85.6 | 80 | 70.9 | 36.4 | 0 | 0 |
| hydrogenated, interesterified lauric cocoa butter substitute | 87.8 | 78.2 | 70.2 | 55 | 40 | 10.6 | 0 |
| confectioners coating, center fat | 88 | 81.4 | 72.9 | 66.4 | 50.5 | 20.4 | 1 |

Therefore, a fat product useful as a cocoa butter substitute, extender, equivalent, improver, or replacer should have an SFC profile wherein the Solid Fat Content is between 60 and 90 at 10° C., preferably between 75 and 90 at 10° C., and most preferably between 80 and 90 at 10° C., and less than 21 at 35° C., preferably less than 15 at 35° C., more preferably less than 10 at 35° C., and most preferably less than 5 at 35° C.

Example 2

Preparation of oils from soybeans and analyses of fatty acid compositions

All of the oils used in these examples were prepared according to the following laboratory scale method. Harvested soybeans were heated in the microwave to 180° F., cooled to room temperature and cracked using a Roskamp TRC 650-6 Crack and Roll. Soybean hulls were removed using a Kice Aspirator and the remaining meats were heated to 180° F. and flaked in a Roskamp TRC 912 Flake and Roll. Crude oil was extracted in a glass, water-jacketed extraction vessel heated to 60° for 45 minutes using a solvent to solids ratio of approximately 4:1. The hexane/oil miscella was collected and the extraction repeated. The miscella was desolventized using a rotary evaporator leaving crude oil.

A volume of an 85% phosphoric acid solution equal to 0.1% (v/v) of the crude oil was added and the solution heated to 65°–70° for 10 minutes while stirring. Warm (60°) NaOH (8% aqueous solution) was added dropwise to the oil to neutralize the free fatty acids and the $H_3PO_4$ with an additional 0.2% wt/wt excess. The solution was stirred for five minutes and the solids separated by centrifugation. The oil was water washed by adding hot water to 20% (v/v) as the sample was heated to 90° with rapid agitation. The oil and water were allowed to cool at room temperature for 10 minutes and then separated by centrifugation. The oil was dehydrated using very rapid agitation under vacuum at 85°–95° for 30 minutes or until all moisture (bubbles, condensation) had been removed. The vacuum was then broken with nitrogen. The oil was bleached by adding 2% (wt/wt) Activated Bleaching Earth (AOCS #Z1077) and the solution mixed under vacuum for 30 minutes at 85°–95° before cooling to 80°. The vacuum was broken with nitrogen and 1% (wt/wt) of diatomaceous earth was added and the mixture filtered through a prepared bed of diatomaceous earth.

Citric acid was added to approximately 50 ppm, and the oil was deodorized at 240° with steam (4 mL water per 100 g oil) in a glass deodorizer for approximately 1 hour. The oil was cooled to 80° with sparging, and it was further cooled to 40° under nitrogen. The refined, bleached, and deodorized oil was stored frozen under a nitrogen atmosphere.

All of the fatty acid composition analyses described in these examples were determined essentially by the methods described in AOCS Ce 1c-89. Fatty acid methyl esters were prepared as follows. Ten JIL oil or liquefied fat was mixed with 1 mL hexane and 0.25 mL of a 3% sodium methoxide solution for 30 minutes. Acetic acid (0.1 mL of a 10% solution) was added, the sample was mixed and the layers separated by centrifugation. The resulting fatty acid methyl esters extracted in the hexane layer were resolved by gas chromatography (GC). Hewlett Packard 5890GC (Wilmington, DE) equipped with a SP2340 column (60 m, 0.25 mm ID, 0.20 micron film thickness) (Supelco, Bellefonte, Pa.). Column temperature was 150° at injection and the temperature programmed from 150° to 200° at 2° C./min over 40 minutes. Injector and detector temperatures were 215° and 230°, respectively. All compositional values reported are relative values calculated from the integrated areas measured by the GC detector.

Example 3

Fractionation of a 22% stearic acid soybean oil

High stearic acid soybeans from the line designated L9216116-109 were developed at DuPont from a pedigree (HST1.(1102.HO4)) A2506 (which means the progeny from a cross between HO2 and HO4, was crossed to HST1, and the resulting progeny was crossed to a wild-type line, A2506 to produce L9216116-109). The seeds produced have a higher stearic acid content and lower linolenic acid content than conventional soybeans. The parents HST1, HO2, and HO4 (see Table 6) are mutant lines selected by the mutagenesis protocols outlined in U.S. Pat. No. 5,710,365, except different soybean lines were used as starting materials for the mutagenesis, and selection was based on variation in fatty acid content instead of carbohydrate content. HST1 is a mutant of line N85-2176 which is a high oleic, low linolenic line developed at North Carolina State University by J. W. Burton (Kuhr et al., Mar. 26, 1987 Release Notice for N85-2124, N85-2131, and N85-2176. USDA Agric Res. Services). HST1 differs from its parent N85-2176 by virtue of its abnormally high stearic acid content (HST=high stearic), while retaining the lower linolenic acid content of N85-2176. The high stearic mutation in HST1 suppresses (is epistatic to) the high oleic gene(s) that are present in the genetic background from N85-2176. Therefore, HSTI is not high in oleic acid like N85-2176. The stearic mutation in HST1 is allelic to fasa (see Table 6) in line A6 (W. Fehr from Iowa State) and results in a similar phenotype when crossed into similar backgrounds as thefasa allele. Crosses between N85-2176 and A5 (W. Fehr from Iowa State) confirm that N85-2176 contains an allele of the fan gene (see Table 6) present in A5 that confers a similar low linolenic phenotype. Therefore, HST1 contains both a high stearic mutation (allelic tofasa) and a low linolenic mutation (aflelic tofan).

HO2 is a DuPont proprietary mutant line selected from mutagenesis of the line N85-2176. The mutagenesis protocol was essentially the same as the one described in U.S. Pat. No. 5,710,365, except that N85-2176 was used as the starting material for mutagenesis, and selection was based upon variation in fatty acid content instead of carbohydrate content. HO2 differs from N85-2176 (fan) in that it has a slightly higher oleic acid content (HO=high oleic), but retains the low linolenic acid content of N85-2176. Therefore, HO2 contains an unnamed mutation that confers higher oleic acid content than N85-2176 in addition to the fan gene.

HO4 is a DuPont proprietary mutant line selected from mutagenesis of the line A5. The mutagenesis protocol was essentially the same as the one described in U.S. Pat. No. 5,710,365, except that A5 was used as the starting material for the mutagenesis, and selection was based upon variation in fatty acid content instead of carbohydrate content. HO4 differs from A5 (fan) in that it has a higher oleic acid content (HO=high oleic), but retains the low linolenic acid content of A5. Therefore, HO4 contains an unnamed mutation that confers higher oleic acid content than A5 in addition to the fan gene.

It is believed that a derivative of A6 (fasa), or similar plant yielding seeds with an oil composition comprising a high stearic and low linolenic acid phenotype similar to that disclosed in the instant invention, would be useful for the methods described herein.

Mature seeds (51 g) from high stearic plants were dissolved in 510 ml acetone and kept at 4° for 24 hours. The solid and liquid materials were separated using a cold jacketed Buchner funnel cooled to 40 under vacuum. Acetone was removed from both the solid and liquid fractions using rotary evaporation. Solid fat (5.8 g) and liquid oil (42 g) were recovered and analyzed for their compositions.

Figure 2:
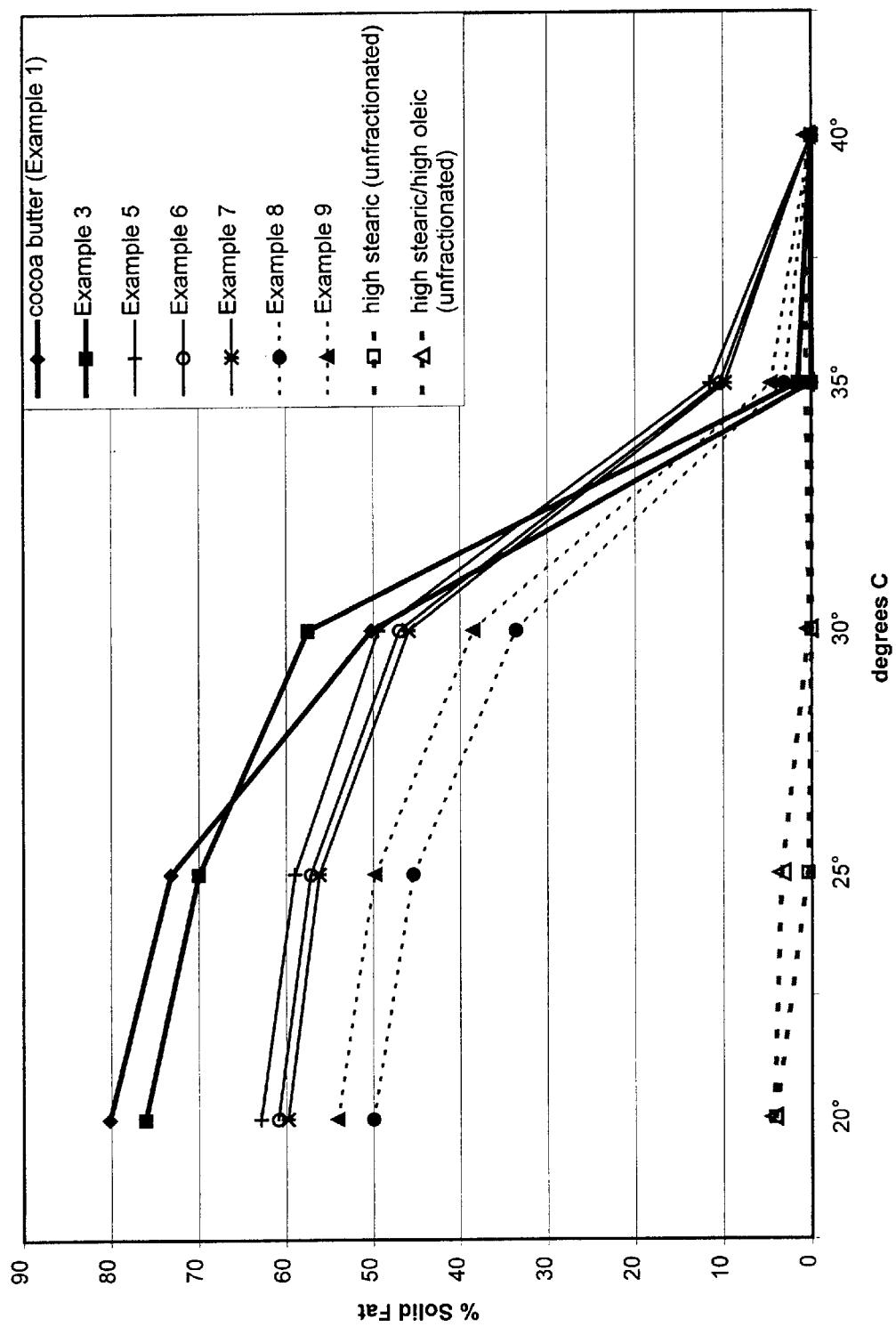
FIG. 2 depicts the SFC profile of similar fractions obtained from different soybean oils (e.g., high stearic acid; high stearic acid/high oleic acid). Fractionation of these oils yielded product(s) having an SFC profile comparable to that of cocoa butter. It was found that the SFC profile of the fractionated oils differed substantially from the SFC profile of the unfractionated oils.

The solid fat fraction was analyzed for SFC using AOCS Method Cdl 6b-93(97) at a variety of temperatures. Tables 4 and 5 show the compositional and functional characteristics of the high stearic acid source oil and the solid and liquid fractions obtained from this oil. The solid fraction was found to be enriched in stearic acid (18:0) and arachidic acid (20:0) as compared to the source material. The SFC profile over the temperature range indicated a sharp drop in the solid fat content between 30° and 35°, similar to the behavior of authentic cocoa butter. This is in sharp contrast to the SFC profile of the unfractionated soybean oil used as the starting material. The results obtained in this Example are compared to the SFC profile of cocoa butter found in Example 1 as shown in FIG. 2.

TABLE 4

Fatty acid compositions

|  | 16:0 | 18:0 | 18:1 | 18:2 | 18:3 | 20:0 |
|---|---|---|---|---|---|---|
| 22% stearic acid soybean oil | 8.7 | 22.1 | 15.1 | 47.2 | 4.8 | 1.5 |
| liquid fraction | 9.1 | 17 | 16.6 | 49.7 | 5.1 | 1.4 |
| solid fraction | 4.8 | 55.1 | 7.3 | 27.2 | 2.5 | 2.5 |

TABLE 5

Solid fraction content as a function of temperature

| | Temperature | | | | | | |
|---|---|---|---|---|---|---|---|
| | 10° | 15° | 20° | 25° | 30° | 35° | 40° |
| SFC of Unfractionated Oil | 13.8 | 7.4 | 4.1 | 0.4 | 0 | 0 | 0 |
| SFC of Solid Fraction | 81.5 | 79.6 | 76.1 | 70 | 57.5 | 1.5 | 0 |

Example 4

Soybeans with High Stearic and High Oleic content

Crosses were performed between a soybean line which has elevated levels of oleic acid in its seed fatty acids and a line which has elevated levels of stearic acid in its seed fatty acids. The high oleic line contains a transgene copy of the soybean fatty acid desaturase gene, gmFAD2-1 (Heppard, E. P. et al. (1996) Plant Physiol. 110:311-319), that results in co-suppression and therefore down regulation of the gmFAD2-1 message level and is described in WO 97/40698. Decreased expression of the FAD2-1 function leads to a decrease in activity of delta-12 desaturase, and a decrease in the accumulation of poly-unsaturated fatty acids. The high oleic line is designated D2T and the typical fatty acid profile of its seed lipid is given in Table 6. The high stearate parent is a fatty acid synthesis mutant isolated from a mutagenized soybean seed population (U.S. Pat. No. 5,585,535), designated A6, and containing a fatty acid mutantfasa allele. Its typical seed lipid fatty acid profile is given in Table 6.

F1 seeds obtained from the crosses were planted to obtain F1 plants. The F1 plants were then self pollinated to obtain F2 seeds that were segregating for both of the loci affecting the seed fatty acid profile. These F2 seeds were planted and the plants were self pollinated as in the previous generation. The relative content of the five main fatty acids in bulked seed samples from individual F2 plants was determined by gas liquid chromatography as described in WO 94/11516. Remaining seed from F2 plants containing maximum stearic and oleic acid content were selected, planted and allowed to self pollinate in order to obtain F3:4 seed. A sample of F4 seed from each F3 plant (F3:4 seed) was then submitted for GC analysis so that individual F3:4 phenotypes could be determined. F3:4 plant phenotypes tracing back to a common F2 plant ancestor were then averaged to obtain mean phenotypes for F2-derived families (F2:4 family means). Single plants and family means that were highest in oleic and stearic acid are shown in Table 6. The individual plant lines and the family means are presented in order of decreasing stearic acid in the seed fatty acids.

TABLE 6

Seed fatty acid profiles from individual plants and F2:4 family means arising from a cross of the high oleic parent D2T and the high stearic parent fasa

| Line ID or gene modification[1] | Individual Fatty Acid Content (% of total seed fatty acid) | | | | | generation and type or reference |
|---|---|---|---|---|---|---|
| | 16:0 | 18:0 | 18:1 | 18:2 | 18:3 | |
| wild type | 12 | 4 | 25 | 51 | 7 | — |
| D2T | 7 | 3 | 85 | 1 | 3 | WO94/11516 |
| fasa | 8 | 23 | 26 | 35 | 7 | U.S. Pat. No. 5,557,037 |
| L9216 (116–109) | 9 | 22 | 15 | 47 | 5 | Example 3, this application |
| N85-2176 | 11 | 3 | 42 | 40 | 4 | Kuhr et al., March 26, 1987, USDA Agric. Res. Services |
| HST1 | 9 | 28 | 15 | 43 | 5 | Example 3, this application |
| HO2 | 11 | 3 | 45 | 37 | 4 | Example 3, this application |
| HO4 | 11 | 3 | 45 | 37 | 4 | Example 3, this application |
| fan | 11 | 3 | 45 | 36 | 4 | U.S. Pat. No. 5,534,425 |
| 7SO-2334-1 | 7 | 26 | 61 | 1 | 3 | F3:4 single plant |
| 7SO-2293-2 | 6 | 26 | 61 | 2 | 3 | F3:4 single plant |
| 7SO-2293-1 | 6 | 25 | 62 | 2 | 3 | F3:4 single plant |
| 7SO-2303-5 | 6 | 24 | 66 | 0 | 2 | F3:4 single plant |
| 7SO-2339-1 | 6 | 24 | 64 | 1 | 3 | F3:4 single plant |
| 7SO-2295-1 | 6 | 24 | 64 | 1 | 3 | F3:4 single plant |
| 7SO-2331-3 | 7 | 24 | 63 | 1 | 3 | F3:4 single plant |
| 7SO-5097-3 | 6 | 20 | 67 | 2 | 3 | F3:4 single plant |
| 7SO-2356-1 | 6 | 18 | 72 | 0 | 3 | F3:4 single plant |
| 7SO-2306-2 | 6 | 18 | 71 | 2 | 3 | F3:4 single plant |
| 7SO-2305-3 | 6 | 18 | 70 | 2 | 2 | F3:4 single plant |
| 7SO-2310-3 | 6 | 18 | 70 | 2 | 3 | F3:4 single plant |
| 7SO-2293 | 6 | 24 | 63 | 2 | 3 | F2:4 family mean of 9 plants |
| 7SO-2334 | 6 | 23 | 65 | 1 | 3 | F2:4 family mean of 8 plants |
| 7SO-2339 | 6 | 23 | 65 | 1 | 3 | F2:4 family mean of 7 plants |
| 7SO-2379 | 6 | 19 | 70 | 1 | 2 | F2:4 family mean of 3 plants |
| 7SO-2305 | 6 | 18 | 71 | 2 | 3 | F2:4 family mean of 10 plants |

[1]The Gene Modifications used in this Table refer to the following:
D2T refers to a delta-12 desaturase construct which is in a sense orientation, the integration of which results in a reduction of activity.
fasa refers to a gene for elevated seed stearic acid content.
L9216116-109 refers to a line with high stearic acid content derived from pedigree (HST1*(HO2*HO4))*wild-type.
HST1 refers to a high stearic acid mutant line derived from N85-2176.
HO2 refers to a high oleic acid mutant line derived from N85-2176.
HO4 refers to a high oleic acid mutant line derived from A5.

The very low poly-unsaturated fatty acid phenotype arising from the D2T parent is maintained in selected progeny from the cross as is the very high level of stearic acid coming from the fasa containing parent. The increased level of stearic acid in the selected progeny from the cross relative to the D2T parent causes a decrease in the oleic acid content.

The A6 mutant line of soybean which contains a defective fasa allele and was used in this cross is environmentally unstable. Environmentally unstable describes a phenotype that is relatively variable, as a result of the environmental conditions in which a plant is grown. That instability leads to variation of the seed fatty acid composition in plants grown at different times and in different geographic locations. Oils produced from the D2T+fasa plants described in this example were found to vary in compositions as well. Examples 5 through 9 employ oils prepared from plants containing the D2T+fasa modifications as starting materials for fractionations. Their compositions are given in Table 7.

TABLE 7

Compositions of oils used in Examples 5 through 9

| | Fatty acid composition | | | | | |
|---|---|---|---|---|---|---|
| | 16:0 | 18:0 | 18:1 | 18:2 | 18:3 | 20:0 |
| Example 5 | 6.0 | 18.6 | 66.8 | 2.3 | 3.6 | 1.5 |
| Example 6 | 5.4 | 17.6 | 67.6 | 3.4 | 3.7 | 1.4 |
| Example 7 | 5.9 | 21.9 | 62.8 | 2.6 | 3.6 | 1.8 |
| Example 8 | 5.2 | 16.2 | 70.8 | 1.7 | 3.9 | 1.2 |
| Example 9 | 5.5 | 17.6 | 67.6 | 3.4 | 3.7 | 1.4 |

Example 5

Fractionation of a high stearic acid /high oleic acid soybean oil

A sample of high stearic acid /high oleic acid soybean oil (50 g, containing 18.6% stearic acid and 66.8% oleic acid) as described in Table 7 above was dissolved in 500 ml acetone and kept at 4° for 25 hours. The solid fat fraction (Solid Fraction, 9.3 g) was separated from the Liquid Fraction (37.4 g) using a cold jacketed Buchner funnel cooled to 4° under vacuum. Residual acetone was removed from both the solid and liquid fractions as described in Example 3 prior to weighing.

The fractions were analyzed for SFC and fatty acid composition as described in Example 3. In addition, the dropping point of the solid fraction was determined using AOCS method Cc18-80-95. The resulting data are presented in Tables 8 and 9. The Solid Fraction recovered as described above was characterized by a significant increase in the stearic acid content relative to the starting material, while the Liquid Fraction showed a modest enrichment of oleic acid from about 67% to about 72%. The SFC profile indicated the Solid Fraction possessed a notable solid character from 10°–20° which then declined particularly rapidly in the temperature range 30° to 35°, indicating this fraction will perform well as a confectionary fat product.

TABLE 8

| | Fatty acid composition | | | | | |
|---|---|---|---|---|---|---|
| | 16:0 | 18:0 | 18:1 | 18:2 | 18:3 | 20:0 |
| high stearic/high oleic acid soybean oil | 6.0 | 18.6 | 66.8 | 2.3 | 3.6 | 1.5 |
| Liquid Fraction | 5.5 | 13.1 | 71.7 | 2.5 | 4.0 | 1.2 |
| Solid Fraction | 8.4 | 40.1 | 44.2 | 1.4 | 1.9 | 2.7 |

TABLE 9

SFC of Solid Fraction as a function of temperature

| | Temperature | | | | | | |
|---|---|---|---|---|---|---|---|
| | 10° | 15° | 20° | 25° | 30° | 35° | 40° |
| SFC of Unfractionated Oil | 29.9 | 19.8 | 4.3 | 3.1 | 0.3 | 0.6 | 0.5 |
| SFC of Solid Fraction | 73.6 | 68.1 | 62.7 | 59.1 | 48.7 | 12.1 | 0 |
| Dropping Point of Solid Fraction | | 31.6 | | | | | |

Example 6

Single step fractionation of a high stearic acid /high oleic acid soybean oil

A sample of high stearic acid /high oleic acid soybean oil (50 g, containing 17.6% stearic acid and 67.6% oleic acid)

as described in Table 7 above was dissolved in 500 ml acetone and kept at 4° C. for 25 hours. The solid fat fraction (Solid Fraction, 8.3 g) was separated by filtration under vacuum using a jacketed Buchner funnel cooled to 40. A Liquid Fraction (38.1 g) was also recovered. Residual acetone was removed from both the solid and liquid fractions as described in Example 3 prior to weighing.

The fractions were analyzed as described in Example 5 and the resulting data are presented in Tables 10 and 11. The Solid Fraction recovered as described above was characterized by a significant increase in the stearic acid content relative to the starting material (17.6% to 39.6%), while the Liquid Fraction showed a modest enrichment of oleic acid from about 68% to about 72% and a concomitant decrease in the stearic acid content (to 12.5%). The SFC profile indicated the Solid Fraction possessed a definite solid character from 10°–20° which then declined particularly rapidly in the temperature range 30° to 35°, indicating this fraction will perform well as a confectionary fat product.

TABLE 10

| | Fatty acid composition | | | | | |
|---|---|---|---|---|---|---|
| | 16:0 | 18:0 | 18:1 | 18:2 | 18:3 | 20:0 |
| high stearic acid/high oleic acid soybean oil | 5.4 | 17.6 | 67.6 | 3.4 | 3.7 | 1.4 |
| Liquid Fraction | 5.1 | 12.5 | 72.4 | 3.7 | 4.1 | 1.2 |
| Solid Fraction | 7.4 | 39.6 | 44.6 | 2.0 | 1.9 | 2.8 |

TABLE 11

SFC of Solid Fraction as a function of temperature

| | Temperature | | | | | | |
|---|---|---|---|---|---|---|---|
| | 10° | 15° | 20° | 25° | 30° | 35° | 40° |
| SFC of Solid Fraction | 71.6 | 66.0 | 60.9 | 57.2 | 47.0 | 10.4 | 0 |
| Dropping Point of Solid Fraction | | 32.2 | | | | | |

Example 7

Fractionation of a high stearic acid /high oleic acid soybean oil

A sample of high stearic acid /high oleic acid soybean oil (50 g, containing 21.9% stearic acid and 62.8% oleic acid) as described in Table 7 above was dissolved in 500 ml acetone and kept at 4° C. for 23 hours. The solid fat fraction (Solid Fraction, 11.6 g) was separated from the Liquid Fraction (31.5 g) by filtration under vacuum using a jacketed Buchner funnel cooled to 4°. Residual acetone was removed from both the solid and liquid fractions as described in Example 3 prior to weighing.

The fractions were analyzed as described in Example 5 and the resulting data are presented in Tables 12 and 13. The Solid Fraction recovered as described above was characterized by a significant increase in the stearic acid content relative to the starting material (21.9% to 40.1%), while the Liquid Fraction showed an enrichment of oleic acid from about 63% to about 69% and a concomitant decrease in the stearic acid content (to 15.5%). The SFC profile indicated the Solid Fraction possessed a solid character from 10°–20° which then declined particularly rapidly in the temperature range 30° to 35°, indicating this fraction will perform well as a confectionary fat product.

TABLE 12

| | Fatty acid composition | | | | | |
|---|---|---|---|---|---|---|
| | 16:0 | 18:0 | 18:1 | 18:2 | 18:3 | 20:0 |
| high stearic acid/high oleic acid soybean oil | 5.9 | 21.9 | 62.8 | 2.6 | 3.6 | 1.8 |
| Liquid Fraction | 5.2 | 15.5 | 68.8 | 2.7 | 4.2 | 1.5 |
| Solid Fraction | 7.4 | 40.1 | 44.8 | 1.4 | 2.0 | 2.9 |

TABLE 13

SFC of Solid Fraction as a function of temperature

| | Temperature | | | | | | |
|---|---|---|---|---|---|---|---|
| | 10° | 15° | 20 | 25° | 30° | 35° | 40° |
| SFC of Solid Fraction | 71.7 | 65.5 | 59.8 | 56.2 | 45.9 | 9.8 | 0 |
| Dropping Point of Solid Fraction | | 31.5 | | | | | |

Example 8

Fractionation of a high stearic acid /high oleic acid soybean oil

A sample of high stearic acid /high oleic acid soybean oil (171 g, containing 16.2% stearic acid and 70.8% oleic acid) as described in Table 7 above was dissolved in 1710 ml acetone and kept at 4° for 23 hours. The solid fat fraction (Solid Fraction, 27 g) was separated from the Liquid Fraction by filtration under vacuum using a jacketed Buchner funnel cooled to 4°. Residual acetone was removed from the solid fraction as described in Example 3 prior to weighing.

The fraction was analyzed as described in Example 3 and the resulting data are presented in Tables 14 and 15. The Solid Fraction recovered as described above was characterized by a significant increase in the stearic acid content relative to the starting material (16.2% to 35.3%). The SFC profile for the solid fraction recovered from this fractionation indicates that the material possessed solid character from 10°–20° C. and had minimal solidity at 35° and was completely melted at 40°, indicating this fraction will perform well as a confectionary fat product.

TABLE 14

| | Fatty acid composition | | | | | |
|---|---|---|---|---|---|---|
| | 16:0 | 18:0 | 18:1 | 18:2 | 18:3 | 20:0 |
| high stearic/high oleic acid soybean oil | 5.2 | 16.2 | 70.8 | 1.7 | 3.9 | 1.2 |
| Solid Fraction | 6.9 | 35.3 | 50.8 | 1.1 | 2.1 | 2.2 |

TABLE 15

SFC of Solid Fraction as a function of temperature

| | Temperature | | | | | |
|---|---|---|---|---|---|---|
| | 10° | 20° | 25° | 30° | 35° | 40° |
| SFC of Solid Fraction | 63.1 | 50.0 | 45.4 | 33.6 | 3.1 | 0 |

Example 9

Fractionation of a high stearic acid /high oleic acid soybean oil

A sample of high stearic acid /high oleic acid soybean oil (51 g, containing 17.6% stearic acid and 67.6% oleic acid) as described in Table 7 above was dissolved in 510 ml acetone and kept at 4° for 24 hours. The solid fat fraction Solid Fraction, 9.6 g) was separated from the Liquid Fraction by filtration under vacuum using a jacketed Buchner funnel cooled to 4°. Residual acetone was removed from the solid fraction as described in Example 3 prior to weighing.

The fraction was analyzed as described in Example 3 and the resulting data are presented in Tables 16 and 17. The solid fraction recovered as described above was characterized by a significant increase in the stearic acid content relative to the starting material (17.6% to 37.1%). The SFC profile for the solid fraction recovered from this fractionation indicates that the material possessed solid character from 10°20° C. and had minimal solidity at 35° and was completely melted at 400, indicating this fraction will perform well as a confectionary fat product.

TABLE 16

| | Fatty acid composition | | | | | |
|---|---|---|---|---|---|---|
| | 16:0 | 18:0 | 18:1 | 18:2 | 18:3 | 20:0 |
| high stearic/high oleic acid soybean oil | 5.5 | 17.6 | 67.6 | 3.4 | 3.7 | 1.4 |
| solid fraction | 7.0 | 37.1 | 47.7 | 2.1 | 1.9 | 2.4 |

TABLE 17

SFC of Solid Fraction as a function of temperature

| | Temperature | | | | | |
|---|---|---|---|---|---|---|
| | 10° | 20° | 25° | 30° | 35° | 40° |
| SFC of solid fraction | 66.4 | 54.1 | 49.8 | 38.5 | 4.6 | 0 |

Example 10

Liquid Fractions From Fractionated Oils Exhibit High Oxidative Stability

Liquid fractions were prepared from high stearic and high stearic/high oleic soybean oils as disclosed in Examples 3, 5, and 6 and were analyzed for fatty acid composition and oxidative stability by the method of OSI. The results are shown in Table 18. The liquid fractions from high stearic/ high oleic soybean oils were characterized by a significant decrease in linoleic acid (2.5%, 3.8% vs. 49.7%). The OSI values show an approximate five fold increase in oxidative stability (33.2, 29.2, vs. 5.8) when compared with the liquid fraction from high stearic soybean oil.

TABLE 18

Fatty acid composition and OSI values for liquid fractions

| | Fatty acid composition | | | | | | |
|---|---|---|---|---|---|---|---|
| | 16:0 | 18:0 | 18:1 | 18:2 | 18:3 | 20:0 | OSI (110° C.) |
| liquid fraction: high stearic (22%) soybean oil | 9.1 | 17.0 | 16.6 | 49.7 | 5.1 | 1.4 | 5.8 |
| liquid fraction: high stearic (19%)/high oleic (67%) soybean oil | 5.5 | 13.1 | 71.7 | 2.5 | 4.0 | 1.2 | 33.2 |
| liquid fraction: high stearic (18%)/high oleic (68%) soybean oil | 5.1 | 12.5 | 72.4 | 3.8 | 4.1 | 1.2 | 29.2 |

What is claimed is:

1. A fat product made from the fractionation of a high stearic soybean oil having a C18:0 content of at least 15% of the fatty acid moieties in the oil wherein said product is useful as a confectionary fat.

2. The fat product of claim 1 wherein the high stearic soybean oil is a non-hydrogenated, non-chemically modified oil.

3. The fat product of claim 1 or claim 2 wherein said product is useful as a cocoa butter substitute.

4. The fat product of claim 1 or claim 2 wherein said product is useful as a cocoa butter extender.

5. The fat product of claim 1 or claim 2 wherein said product is useful as a cocoa butter equivalent.

6. The fat product of claim 1 or claim 2 wherein said product is useful as a cocoa butter improver.

7. The fat product of claim 1 or claim 2 wherein said product is useful as a cocoa butter replacer.

8. The fat product of claim 1 or claim 2 wherein said product is useful as a hard butter.

9. The fat product of claim 1 or claim 2 wherein said product is useful as a coating fat.

10. The fat product of claim 1 or claim 2 wherein said product is useful as a center filling fat.

11. The fat product of claim 1 or claim 2 wherein said product has a Solid Fat Content of between 60 and 90 at 10° C. and less than 21 at 35° C.

12. The fat product of claim 1 or claim 2 wherein said product has a Solid Fat Content of between 60 and 90 at 10° C. and less than 10 at 35° C.

13. The fat product of claim 1 or claim 2 wherein said product has a Solid Fat Content of between 60 and 90 at 10° C. and less than 5 at 35° C.

14. The fat product of claim 1 or claim 2 wherein said product has a Solid Fat Content of between 75 and 90 at 10° C. and less than 5 at 35° C.

15. The fat product of claim 1 or claim 2 wherein said product has a Solid Fat Content of between 80 and 90 at 10° C. and less than 5 at 35° C.

16. The fat product of claim 1 or claim 2 wherein said product has a stearic acid content greater than 35%.

17. The fat product of claim 1 or claim 2 wherein said product has a stearic acid content greater than 40%.

18. The fat product of claim 1 or claim 2 wherein said product has a stearic acid content greater than 50%.

19. A confectionary which comprises the fat product of claim 1 or 2.

20. A confectionary which comprises the fat product of claim 11.

21. A confectionary which comprises the fat product of claim 12.

22. A confectionary which comprises the fat product of claim 13.

23. A confectionary which comprises the fat product of claim 14.

24. A confectionary which comprises the fat product of claim 15.

25. A confectionary which comprises the fat product of claim 16.

26. A confectionary which comprises the fat product of claim 17.

27. A confectionary which comprises the fat product of claim 18.

28. A blended fat product suitable for making confectionary products which comprises the fat product of claim 1 or 2.

29. A blended fat product suitable for making confectionary products which comprises the fat product of claim 11.

30. A blended fat product suitable for making confectionary products which comprises the fat product of claim 12.

31. A blended fat product suitable for making confectionary products which comprises the fat product of claim 13.

32. A blended fat product suitable for making confectionary products which comprises the fat product of claim 14.

33. A blended fat product suitable for making confectionary products which comprises the fat product of claim 15.

34. A blended fat product suitable for making confectionary products which comprises the fat product of claim 16.

35. A blended fat product suitable for making confectionary products which comprises the fat product of claim 17.

36. A blended fat product suitable for making confectionary products which comprises the fat product of claim 18.

37. A method for making a fat product for confectionery applications which comprises fractionating a high stearic soybean oil having a C18:0 content of at least 15% of the fatty acid moieties in the oil under conditions suitable for obtaining a fat product useful for confectionery applications.

38. The method of claim 37 wherein the high stearic soybean oil is a non-hydrogenated, non-chemically modified oil.

39. The method of claim 37 or 38 wherein fractionation comprises a wet fractionation using an organic solvent at a temperature less than 5° C., and collecting a solid fraction useful as a confectionary fat.

40. A method for making two products wherein one product is for confectionery applications and the second product is a high stearic, high oleic soybean oil having high oxidative stability, said method comprising fractionating a high stearic, high oleic soybean oil having a C18:0 content of at least 15% of the fatty acid moieties in the oil and a C18:1 content of greater than 55% of the fatty acid moieties in the oil under conditions suitable for obtaining a fat product useful for confectionary applications.

41. The method of claim 40 wherein the high stearic, high oleic soybean oil is a non-hydrogenated, non-chemically modified oil.

42. The method of claim 40 or 41 wherein the high stearic, high oleic soybean oil has an OSI (110) greater than 25.

* * * * *